(12) United States Patent
Matthiesen et al.

(10) Patent No.: US 8,342,788 B2
(45) Date of Patent: Jan. 1, 2013

(54) CHIPLESSLY THREAD-FORMING SCREW

(75) Inventors: Sven Matthiesen, Lindau (DE); Frank Rieger, Zellerberg (DE); Peter Hertlein, Gams (CH); Michael Baumgartner, Kriessern (CH); Peter Mugg, Nueziders (AT); Matthias Schaefer, Coburg (DE)

(73) Assignee: Hilti Aktiengesellschaft, Schaan (LI)

(*) Notice: Subject to any disclaimer, the term of this patent is extended or adjusted under 35 U.S.C. 154(b) by 1189 days.

(21) Appl. No.: 11/804,268

(22) Filed: May 16, 2007

(65) Prior Publication Data
US 2008/0038088 A1     Feb. 14, 2008

(30) Foreign Application Priority Data
May 16, 2006  (DE) .................. 10 2006 000 232

(51) Int. Cl.
    *F16B 25/00*     (2006.01)
(52) U.S. Cl. ....................... 411/386; 411/411
(58) Field of Classification Search .................. 411/386, 411/411, 424, 426
    See application file for complete search history.

(56) References Cited

U.S. PATENT DOCUMENTS

| | | | | |
|---|---|---|---|---|
| 507,919 A * | 10/1893 | Morgan | ......................... | 411/426 |
| 924,273 A * | 6/1909 | Rehse | ............................ | 411/418 |
| 3,056,234 A * | 10/1962 | Nelsson et al. | ................. | 52/363 |
| 4,844,676 A | 7/1989 | Adamek | | |
| 5,417,776 A * | 5/1995 | Yoshino et al. | ............... | 148/318 |
| 5,597,357 A | 1/1997 | Roberts | | |
| 5,863,167 A * | 1/1999 | Kaneko | .......................... | 411/426 |
| 5,882,162 A * | 3/1999 | Kaneko | .......................... | 411/411 |
| 5,897,280 A * | 4/1999 | Dicke | ........................... | 411/411 |

FOREIGN PATENT DOCUMENTS
DE        9637969        3/1998

* cited by examiner

*Primary Examiner* — Victor Batson
(74) *Attorney, Agent, or Firm* — Abelman, Frayne & Schwab

(57) ABSTRACT

A chiplessly thread-forming screw has a stem (11) at one end of which a tip (13) is provided and at another end of which a head (14) is provided, and which has a pointed conical section (21) extending from the tip (13) in a direction of the head (14), a cylindrical section (25) arranged between the first pointed section (21) and the head (14), a first cambered section (22) adjoining the pointed conical section (21) in the direction of the head, and a second cambered section (24) arranged between the first cambered section (22) and the cylindrical section (25) and an outer surface (16) of which has a second curvature radius (R2) unequal to the first curvature radius (R1) of the outer surface (12) of the first cambered section (21).

8 Claims, 1 Drawing Sheet

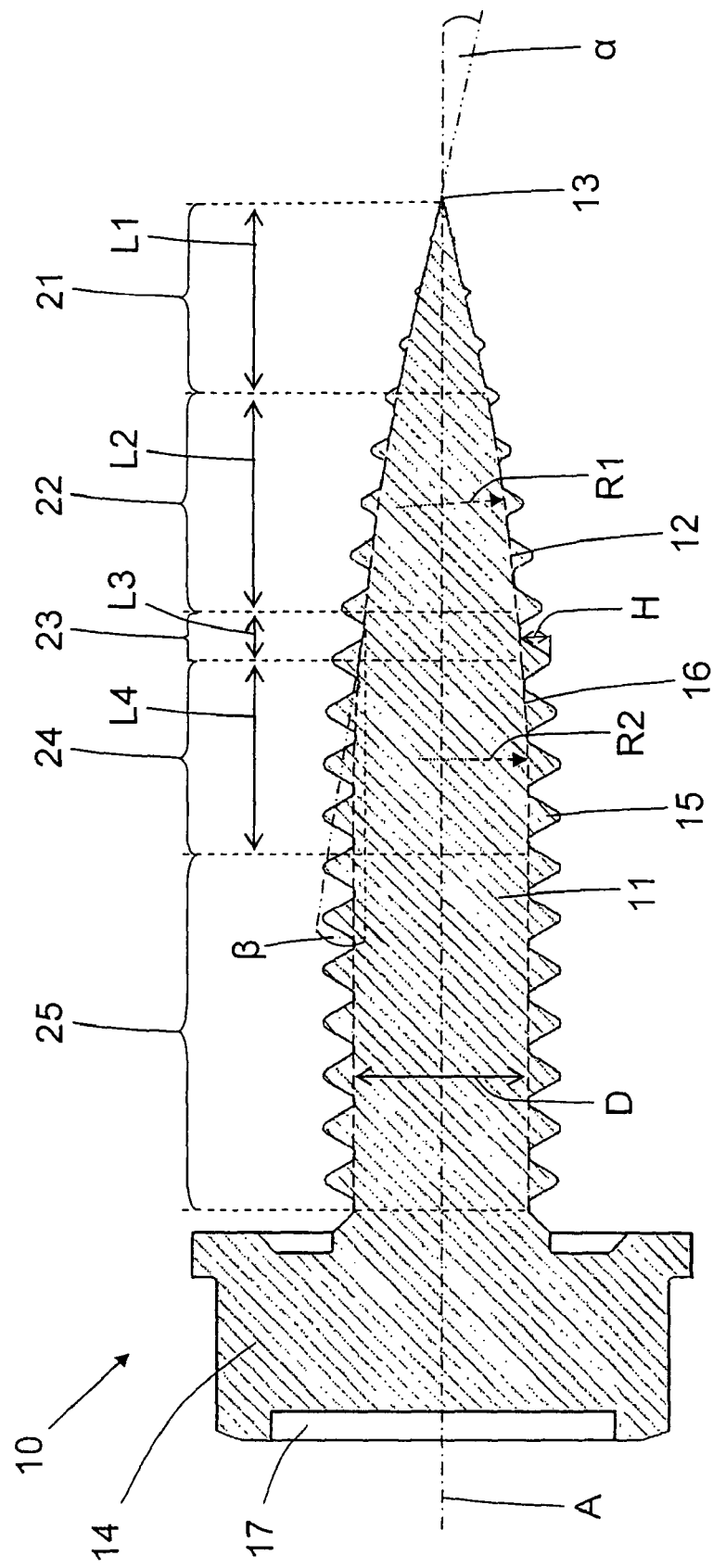

CHIPLESSLY THREAD-FORMING SCREW

BACKGROUND OF THE INVENTION

1. Field of the Invention

The present invention relates to a chiplessly thread-forming screw used, in particular, for screwing metal sheets and having a stem carrying at least regionwise, a thread, a tip provided at one end of the stem, and a head provided at an opposite end of the stem, with the stem having a pointed conical section extending from the tip in a direction of the head and a cylindrical section arranged between the pointed section and the head.

2. Description of the Prior Art

U.S. Pat. No. 4,844,676 discloses a self-penetrating screw having a head and a stem which adjoins the head and has, at its end remote from the head, a tip. The stem has a cambered section that tapers toward the tip, and a cylindrical section that adjoins the cambered section in the direction of the head. The cambered section has a first thread with thread turns which are spaced relatively far form each other, whereas the cylindrical section has a second thread with thread turns arranged relatively close to each other. A cambered transitional region is provided between the first, cambered section and the second, cylindrical surface.

The drawback of the above-described self-penetrating screw consists in that it can be used only for very thin metal sheets such as, e.g., used in an automobile industry. This screw is not suitable for screwing together a stack of several, arranged one above another, metal sheets.

German Patent DE 196 37 969 discloses a chiplessly hole- and thread-forming screw having a head with a tool receptacle and an adjoining the tool head, thread stem that passes in a conical tapering section. In this screw, a first region of the conical section having a polygonal cross-section adjoins a substantially cylindrical thread stem, whereas the second region forms a tip cone, with the cone angle of both the first and second regions amounting to about 60°.

The drawback of the screw described immediately above consists in that it likewise can be used for very thin sheets having a thickness of about 1.5 mm or lower. Further, the use of this screw requires application of high press-on forces, which are provided in the automobile industry by setting robots. For screwing a stack of arranged one above another, sheets, this screw is likewise not suitable.

U.S. Pat. No. 5,597,357 discloses a self-drilling screw that has, at the end of its stem remote from the head, a drilling tip. This self-drilling screw is capable of penetrating metal sheets having a thickness of more than 2 mm.

The drawback of this self-drilling screw consists, however, in that during the setting process, chips are formed which must be removed, with substantial expenses, for corrosion reasons. In addition, a user should apply a high press-on force during the entire drilling process. Also, with formation of chips, a certain amount of material becomes lost and cannot form part of a holding force recipient.

Accordingly, an object of the present invention is to provide a thread-forming screw in which the foregoing drawbacks of the known screw are eliminated.

Another object of the present invention is to provide a thread-forming screw capable of penetrating, without formation of chips, a stack of at least two, arranged one above another metal plates with a common thickness of at least 2 mm.

SUMMARY OF THE INVENTION

This and other objects of the present invention, which will become apparent hereinafter, are achieved by providing a chiplessly thread-forming screw having a stem carrying, at least regionwise, a thread, and provided with a tip at one end of the stem, and a head provided at an opposite end of the stem, with the stem including a first, pointed conical section extending from the tip in a direction of the head, a cylindrical section arranged between the first pointed section and the head, a first cambered section adjoining the pointed conical section in the direction of the head, and a second cambered section arranged between the first cambered section and the cylindrical section and an outer surface of which has a curvature radius unequal to the curvature radius of the outer surface of the first cambered section.

The novel features of the thread-forming screw according to the present invention permit to provide a chiplessly thread-forming screw capable to penetrate and form a thread in a stack of metal sheets with a total thickness of from 2 mm to about 4 mm. It is further insured that even with screws having a maximum stem diameter of more than 4 mm, the load-bearing capacity is not exceeded. Further, the length of the screw has not been essentially increased.

Advantageously, a conical transitional section is provided between the first cambered section and the second cambered section. The conical transitional section prevents a sharp load increase between the two cambered regions when the screw is screwed in.

Advantageously, the curvature radius of the second cambered section is smaller than the curvature radius of the first cambered section. Thereby, a greater rise of the stem outer surface is achieved in the region of the second cambered section than in the region of the first cambered portion.

Advantageously, the pointed conical section has a cone angle from 10° to 20°. Such an angle insures that a smaller press-on force is necessary for penetration of the screw into the to-be-screwed material.

Advantageously, the conical transitional section has a cone angle that amounts to from 6° to 40°. Such an angle likewise reduces the press-on force for penetration of the transitional section. The second curvature radius amounts to from 15 to 30 mm.

It is further advantageous when the thread extends from the cylindrical section to the pointed conical section, with a thread height being reduced toward the pointed conical section. With this feature, on one hand, it is insured that the screw is automatically pulled into the material or component at first penetration upon rotation of the screw. On the other hand, it insures that at the first penetration, the press-on force can be maintained very low.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

In the Drawings:

Single FIGURE shows a longitudinal cross-sectional view of a thread-forming screw according to the present invention.

DETAILED DESCRIPTION OF THE PREFERRED EMBODIMENT

A chiplessly hole and thread-forming screw 10 according to the present invention, which is shown in the drawing FIG- URE, has a stem 11 which carries a thread 15 and which is provided with a tip 13 at one of its ends and a head 14 at its opposite end. A screw axis A defines an axial direction of the screw 10. The head 14 has a tool receptacle 17 for receiving a screwing tool such as a screwing bit or a screwdriver. A pointed conical section 21 extends from the tip 13 in a direction of head 14. A first cambered section 22 adjoins the pointed conical section 21 at the end of the section 21 remote from the tip 13. A conical transitional section 23 adjoins the first cambered section 22 in the direction of the head 14. A second cambered section 24 follows the conical transitional section 23 in the direction of the head 14, and a cylindrical section 25 adjoins the second cambered section 24 in the direction of the head 14.

An outer surface 12 of the first cambered section 22 has, in the axial direction of the screw 10, a radius R1 from 30 to 100 mm. The outer surface 16 of the second cambered section 24 has, in the axial direction of the screw 10, a radius R2 from 15 to 30 mm. Thus, the radius of the curvature R1 of the first cambered section 22 is greater than the curvature radius R2 of the second cambered section 24. The outer surfaces of the separate sections 21, 22, 23, 24, 25 adjoin each other without any steps or jumps.

The pointed conical section 21 has a tip angle $\alpha$ between 10° and 20°, and a cone angle $\beta$ of the conical transition surface 23 amounts to between 6° and 40°.

The thread 15 has a thread height H that is substantially constant from the cylindrical section 25 up to the second cambered section 24. Starting from the conical transitional section 23 and up to the pointed conical section 21, the height H of the thread 15 is gradually reduced in the direction of tip 13, with the thread 15 extending almost up to tip 13.

The stem 11 of the screw 10 has, in the region of the cylindrical section 25, a diameter D of, e.g., from 1.5 to 7 mm. The conical transitional section 23 extends in the axial direction of the screw to over the length L3 which is smaller than the diameter D of the cylindrical section 25. The axial length L1 of the pointed conical section 21, the axial length L2 of first cambered section 22, and the axial length L4 of the second cambered section 24 are all greater than the diameter D of the cylindrical section 25.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A chiplessly thread-forming screw (10), comprising a stem (11) carrying, at least regionwise, a thread (15); a tip (13) provided at one end of the stem (11); and a head (14) provided at an opposite end of the stem (11), wherein the stem (11) has a pointed conical section (21) extending from the tip (13) in a direction of the head (14), a cylindrical section (25) arranged between the first pointed section (21) and the head (14), a first cambered section (22) adjoining the pointed conical section (21) in the direction of the head (14) and an outer surface (12) of which has, in an axial direction of the screw, a first curvature radius (R1), and a second cambered section (24) arranged between the first cambered section (22) and the cylindrical section (25) and an outer surface (16) of which has a second curvature radius (R2) unequal to the first curvature radius (R1) of the outer surface (12) of the first cambered section (22).

2. A screw according to claim 1, wherein a conical transitional section (23) is provided between the first cambered section (22) and the second cambered section (24).

3. A screw according to claim 1, wherein the second curvature radius (R2) is smaller than the first curvature radius (R1).

4. A screw according to claim 1, wherein the pointed conical section (21) has a cone angle ($\alpha$) that amounts from 10° to 20°.

5. A screw according to claim 2, wherein the conical transitional section (23) has a cone angle ($\beta$) that amounts to from 6° to 40°.

6. A screw according to claim 1, wherein the first curvature radius (R1) amounts to from 30 to 100 mm.

7. A screw according to claim 1, wherein the second curvature radius (R2) amounts to from 15 to 30 mm.

8. A screw according to claim 1, wherein the thread (15) extends from the cylindrical section (25) to the pointed conical section (21), with a thread height (H) diminishing toward the pointed conical section (21).

* * * * *